United States Patent
Zhao et al.

(10) Patent No.: US 9,811,207 B2
(45) Date of Patent: Nov. 7, 2017

(54) ARRAY SUBSTRATE, IN-CELL TOUCH SCREEN AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Weijie Zhao, Beijing (CN); Xue Dong, Beijing (CN); Shengji Yang, Beijing (CN); Haisheng Wang, Beijing (CN); Hongjuan Liu, Beijing (CN); Yingming Liu, Beijing (CN); Xiaoliang Ding, Beijing (CN); Changfeng Li, Beijing (CN); Wei Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/904,869

(22) PCT Filed: Apr. 28, 2015

(86) PCT No.: PCT/CN2015/077687
§ 371 (c)(1),
(2) Date: Jan. 13, 2016

(87) PCT Pub. No.: WO2016/119323
PCT Pub. Date: Aug. 4, 2016

(65) Prior Publication Data
US 2016/0370944 A1    Dec. 22, 2016

(30) Foreign Application Priority Data

Jan. 30, 2015  (CN) .......................... 2015 1 0051243

(51) Int. Cl.
*G06F 3/041* (2006.01)
*G06F 3/044* (2006.01)

(52) U.S. Cl.
CPC ............ *G06F 3/0418* (2013.01); *G06F 3/041* (2013.01); *G06F 3/044* (2013.01); *G06F 3/0412* (2013.01); *G06F 2203/04111* (2013.01)

(58) Field of Classification Search
CPC ........ G06F 3/044; G06F 3/041; G06F 3/0412; G06F 3/0418
(Continued)

(56) References Cited

U.S. PATENT DOCUMENTS 8,502,796 B1    8/2013  Yilmaz
9,098,134 B2 *  8/2015  Lee .......................... G06F 3/044
(Continued)

FOREIGN PATENT DOCUMENTS

CN    103809801 A    5/2014
CN    103941903 A    7/2014
(Continued)

OTHER PUBLICATIONS

First Office Action regarding Chinese Application No. 201510051243.2, dated Jan. 24, 2017. Translation provided by Dragon Intellectual Property Law Firm.
(Continued)

*Primary Examiner* — Adam J Snyder
(74) *Attorney, Agent, or Firm* — Harness, Dickey & Pierce, P.L.C.

(57) ABSTRACT

The present disclosure provides an array substrate, an in-cell touch screen and a display device. The array substrate includes a plurality of touch electrodes arranged at an identical layer and separated from each other, and a plurality of wires arranged at a layer different from the touch electrodes and configured to connect the touch electrodes to a
(Continued)

touch detection circuit. A difference in overlapping areas between each touch electrode and the wires corresponding to the other touch electrodes in a coverage region of the touch electrode is less than a predetermined threshold.

9 Claims, 4 Drawing Sheets

(58) Field of Classification Search
USPC .................................... 345/173; 178/18.06
See application file for complete search history.

(56) References Cited

U.S. PATENT DOCUMENTS

| | | | |
|---|---|---|---|
| 9,110,583 B2* | 8/2015 | Park | G06F 3/044 |
| 9,218,085 B2* | 12/2015 | Hwang | G06F 3/044 |
| 9,436,331 B2* | 9/2016 | Jo | G06F 3/044 |
| 9,524,064 B2* | 12/2016 | Kim | G06F 3/044 |
| 9,665,222 B2* | 5/2017 | Zhao | G06F 3/044 |
| 9,678,594 B2* | 6/2017 | Wang | G06F 3/0416 |
| 9,684,420 B2* | 6/2017 | Liu | G06F 3/044 |
| 2012/0218199 A1* | 8/2012 | Kim | G06F 3/0412 345/173 |
| 2013/0162570 A1* | 6/2013 | Shin | G06F 3/044 345/173 |
| 2013/0257794 A1* | 10/2013 | Lee | G06F 3/044 345/174 |
| 2014/0118277 A1* | 5/2014 | Kim | G06F 3/044 345/173 |
| 2014/0184560 A1* | 7/2014 | Adachi | G06F 3/044 345/174 |
| 2015/0378486 A1* | 12/2015 | Yu | G06F 3/0412 345/174 |
| 2016/0026291 A1* | 1/2016 | Zhao | G06F 3/044 345/174 |
| 2016/0209951 A1* | 7/2016 | Liu | G06F 3/044 |
| 2016/0246408 A1* | 8/2016 | Wang | G06F 3/044 |
| 2016/0274715 A1* | 9/2016 | Wang | G02F 1/13 |
| 2016/0306454 A1* | 10/2016 | Wang | G06F 3/0412 |

FOREIGN PATENT DOCUMENTS

| | | |
|---|---|---|
| CN | 104020891 A | 9/2014 |
| CN | 104020893 A | 9/2014 |
| CN | 104022127 A | 9/2014 |

OTHER PUBLICATIONS

International Search Report and Written Opinion of the International Searching Authority for International Application No. PCT/CN2015/077687, dated Nov. 2, 2015. Translation provided by Dragon Intellectual Property Law Firm.

* cited by examiner

ARRAY SUBSTRATE, IN-CELL TOUCH SCREEN AND DISPLAY DEVICE

CROSS-REFERENCE TO RELATED APPLICATION

This application is the U.S. national phase of PCT Application No. PCT/CN2015/077687 filed on Apr. 28, 2015, which claims a priority of the Chinese Patent Application No. 201510051243.2 filed on Jan. 30, 2015, the disclosures of which are incorporated in their entirety by reference herein.

TECHNICAL FIELD

The present disclosure relates to the field of display technology, in particular to an array substrate, an in-cell touch screen and a display device.

BACKGROUND

Currently, existing capacitive in-cell touch screens include a mutually capacitive touch screen and a self capacitive touch screen. For the self capacitive touch screen, a layer of touch electrodes may be arranged in the touch screen, and a driving signal is applied to each touch electrode. When no touch has been made, a capacitance of the touch electrode is of a constant value a, and when the touch has been made by a finger, the resultant capacitance is a sum of a capacitance of the finger and the original capacitance a. By detecting a change in the capacitance of the touch electrode, it is able to determine a position where the touch is made.

SUMMARY

An object of the present disclosure is to provide an array substrate, an in-cell touch screen and a display device, so as to improve a touch effect as compared with the related art where different capacitances occur between each touch electrode of a self capacitive touch screen and a wire corresponding to the other touch electrode within coverage of the touch electrode.

In one aspect, the present disclosure provides in some embodiments an array substrate, including gate lines, data lines, a plurality of touch electrodes arranged at an identical layer within display regions defined by the gate lines and data lines and separated from each other, and a plurality of wires arranged at a layer different from the touch electrodes and each configured to connect a corresponding touch electrode to a touch detection circuit. A difference in overlapping areas between each touch electrode and the wires corresponding to the other ouch electrodes in a coverage region of the touch electrode is less than a predetermined threshold.

The plurality of touch electrodes forms a common electrode layer, a common electrode signal is applied to each touch electrode by the touch detection circuit within a display period, and a change in a capacitance of each touch electrode is detected within a touch period so as to determine a position where a touch has been made.

The plurality of wires is arranged parallel to each other and with an identical length and width, and the wires are arranged in an identical number within each of the coverage regions of the touch electrodes.

At least a portion of the wires each includes a first segment connected to a corresponding touch electrode through a via-hole, a second segment for connecting the first segment and the touch detection circuit, and a third segment connected to the first segment and formed by extending the first segment in a direction away from the second segment.

Alternatively, the array substrate further includes resistive wires arranged at a layer different from the touch electrodes and each connected in parallel to each touch electrode through at least two via-holes.

Alternatively, the resistive wires are arranged at a layer identical the wires.

Alternatively, a plurality of wires and a plurality of resistive wires are arranged at the coverage region of each touch electrode, and the resistive wires are arranged at both sides of each wire.

Alternatively, a plurality of wires and a plurality of resistive wires are arranged at the coverage region of each touch electrode, and the resistive wires are arranged alternately between the wires corresponding to different touch electrodes within the coverage region of the touch electrode.

Alternatively, projections of the resistive wires and the wires onto the array substrate in a perpendicular direction are located within a region where projections of the data lines onto the array substrate in the perpendicular direction are located.

Alternatively, the resistive wires and the wires are provided in an amount and distributed in a manner identical to the data lines.

Alternatively, each wire is connected to the corresponding touch electrode through a plurality of via-holes.

In another aspect, the present disclosure provides in some embodiments an in-cell ouch screen including the above-mentioned array substrate.

In yet another aspect, the present disclosure provides in some embodiments a display device including the above-mentioned in-cell touch screen and a touch detection circuit configured to determine a position where a touch has been made in accordance with a change in a capacitance of a touch electrode.

According to the embodiments of the present disclosure, a difference in the overlapping areas between each touch electrode of the self capacitive touch screen and the wires corresponding to the other touch electrodes (i.e., non-connection wires) in the coverage region of the touch electrode is less than the predetermined threshold. As a result, it is able to ensure that the capacitances generated between the touch electrodes and the non-connection wires in the coverage regions are identical or approximately identical to each other, thereby to improve a touch effect of the self capacitive touch screen.

DETAILED DESCRIPTION

For ease of the description in the following embodiments, within a coverage region of a touch electrode of a self capacitive touch screen, a wire connected to the touch electrode is referred to as a connection wire, and a wire corresponding to the other touch electrode is referred to as a non-connection wire.

Figure 1:
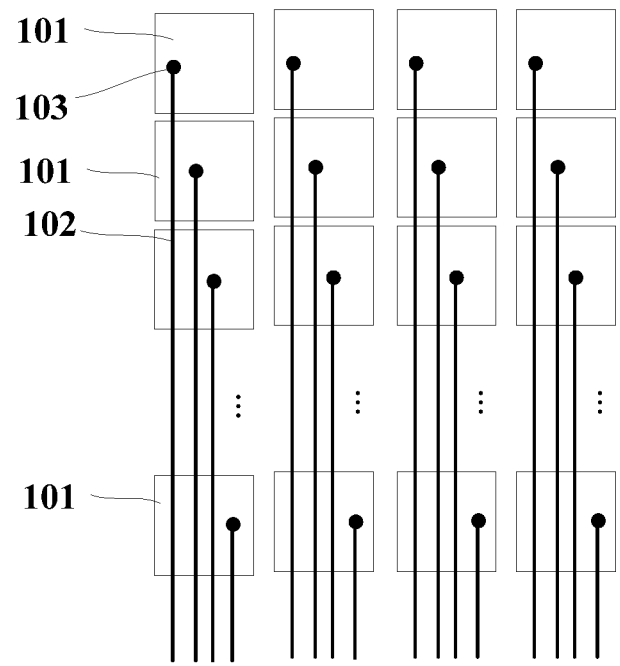
FIG. 1 is a plan view of an array substrate of a self capacitive touch screen.

Referring to FIG. 1, which is a plan view of an array substrate of a self capacitive touch screen in the related art, the array substrate includes a plurality of touch electrodes 101 arranged at an identical layer and separated from each other, and a plurality of wires 102 arranged at a layer different from the touch electrodes 101 and each configured to connect a corresponding touch electrode 101 to a touch detection circuit. Each wire 102 is connected to a corresponding touch electrode 101 through a via-hole 103.

Figure 2:
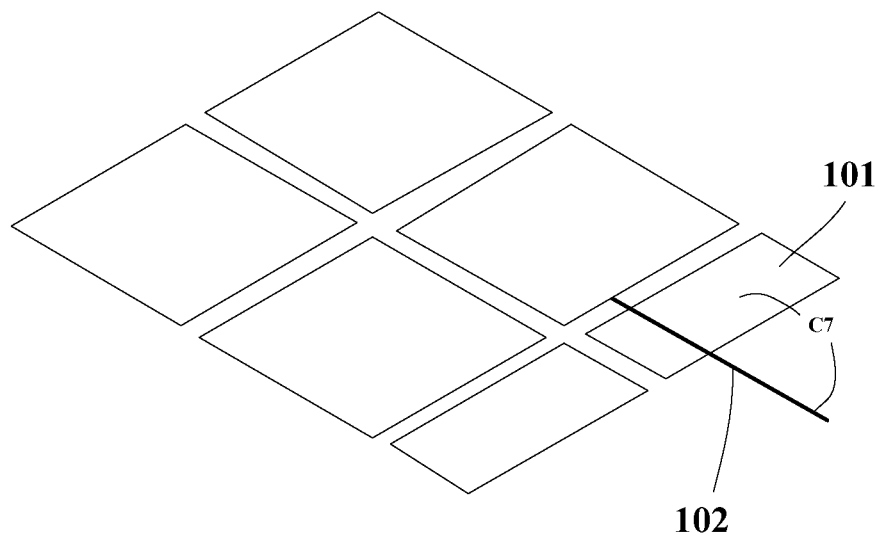
FIG. 2 is a solid view of the array substrate in FIG. 1.

Referring to FIG. 2, a capacitance C7 is generated between the touch electrode 101 and a wire 102 corresponding to the other touch electrode 101 (referred to as a non-connection wire hereinafter) within a coverage region of the touch electrode 101. As shown in FIG. 1, within the coverage regions of the touch electrodes 101 in an identical column, the number of the non-connection wires is different. Taking the touch electrodes 101 in a first column in FIG. 1 as an example, no non-connection wire is provided within the coverage region of the touch electrode 101 in a first row, one non-connection wire is provided within the coverage region of the touch electrode in a second row, two non-connection wires are provided within the coverage region of the touch electrode in a third row, and so on. The most non-connection wires are provided within the coverage region of the touch electrode 101 in the last row. In the case that the number of the non-connection wires within the coverage regions of the touch electrodes 101 in an identical column is different, the capacitances C7 generated between the respective touch electrodes 101 and the non-connection wire(s) within the coverage regions are surely different from each other. As a result, a touch effect of the entire touch screen will be adversely affected.

According to an equation $C=\epsilon s/d$ for calculating capacitance, the capacitance generated between the touch electrode and the non-connection wire within its coverage region depends on an overlapping area s and a distance d between the touch electrode and the non-connection wire. When the distance d is constant, the capacitance generated therebetween may be changed by changing the overlapping area s.

Hence, in the embodiments of the present disclosure, the overlapping areas between the touch electrodes of the self capacitive touch screen and the non-connection wires within the coverage regions are changed, so that a difference in the overlapping areas is less than a predetermined threshold. In this way, it is able to ensure that the capacitances generated between the touch electrodes and the non-connection wires in the coverage regions are identical or approximately identical to each other, thereby to improve a touch effect of the self capacitive touch screen.

The present disclosure will be described hereinafter in conjunction with the drawings and embodiments. The following embodiments are for illustrative purposes only, but shall not be used to limit the scope of the present disclosure.

The present disclosure provides in some embodiments an array substrate, which includes gate lines, data lines, a plurality of touch electrodes arranged at an identical layer within display regions defined by the gate lines and data lines and separated from each other, and a plurality of wires arranged at a layer different from the touch electrodes and configured to connect the touch electrodes to a touch detection circuit. A difference in overlapping areas between each touch electrode and the wires corresponding to the other touch electrodes (i.e., the non-connection wires) in a coverage region of the touch electrode is less than a predetermined threshold. As a result, it is able to ensure that the capacitances generated between the touch electrodes and the non-connection wires in the coverage regions are identical or approximately identical to each other, thereby to improve a touch effect of the self capacitive touch screen.

Alternatively, the plurality of wires within each display region is arranged parallel to each other with an identical length and width, and the wires are arranged in an identical amount within the coverage regions of the touch electrodes, so as to enable the difference in the overlapping areas between each touch electrode and the non-connection wires within the coverage region of the touch electrode is less than a predetermined threshold.

Figure 3:
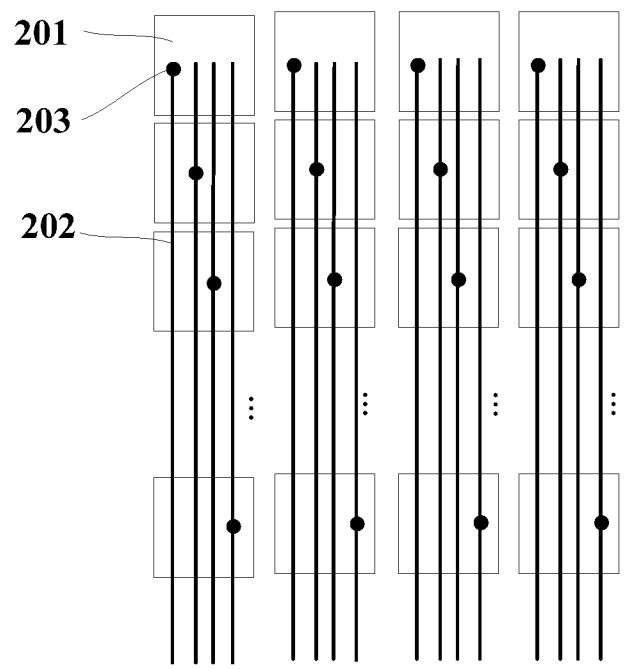
FIG. 3 is a schematic view showing the array substrate according to one embodiment of the present disclosure.

Referring to FIG. 3, which is a schematic view showing the array substrate according to one embodiment of the present disclosure, the array substrate includes gate lines (not shown), data lines (not shown), a plurality of touch electrodes 201 arranged at an identical layer within display regions defined by the gate lines and data lines and separated from each other, and a plurality of wires 202 arranged at a layer different from the touch electrodes 201 and configured to connect the touch electrodes 201 to a touch detection circuit (not shown). The plurality of touch electrodes 201 is of an identical size and arranged in a matrix form.

As shown in FIG. 3, the plurality of wires 202 within each display region is arranged parallel to each other with an identical length and width, and the wires 202 are arranged in an identical amount within the coverage regions of the touch electrodes 201, so as to enable the difference in the overlapping areas between each touch electrode 201 and the non-connection wires within the coverage region is less than a predetermined threshold.

In the embodiments of the present disclosure, each wire 202 is connected to the corresponding touch electrode 201 through at least one via-hole 203. Generally, referring to FIG. 4, each wire 202 is connected to the corresponding touch electrode 201 through a plurality of via-holes 203, so as to ensure the connection reliability.

Figure 4:
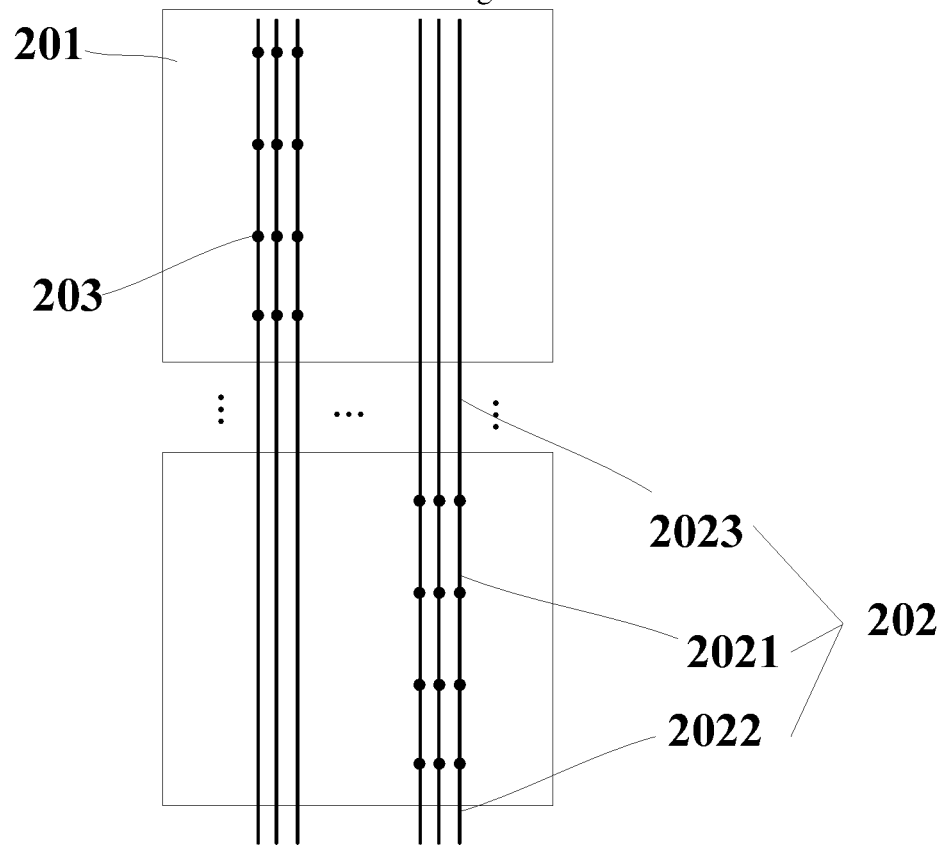
FIG. 4 is another schematic view showing the array substrate according to one embodiment of the present disclosure.

Referring to FIG. 4, when the wires 202 are connected to the corresponding touch electrodes 201 through a plurality of via-holes 203, at least a portion of the wires 202 each includes a first segment 2021 connected to the corresponding touch electrode 201 through the via-holes 203, a second segment 2022 for connecting the first segment 2021 and the touch detection circuit, and a third segment 2023 connected to the first segment 2021 and formed by extending the first segment 2021 in a direction away from the second segment 2022. As compared with the wires in FIG. 1, the third segment 2023 is newly added so as to compensate for the capacitance.

In FIG. 4, in each column, the touch electrode 201 at an upper portion is located furthest from a touch driver circuit, and the touch electrode 201 at a lower portion is located closest to the touch driver circuit.

In the other embodiments of the present disclosure, the wire may be connected to the corresponding touch electrode merely through one via-hole. At this time, at least a portion of the wires each includes a first segment and a second segment at both sides of the via-hole. The first segment is connected to the touch detection circuit, and the second segment is formed by extending the first segment away from the touch detection circuit.

Generally, the above-mentioned "at least a portion of the wires" refers to the connection wires corresponding to the other touch electrodes other than the touch electrodes in a row furthest from the touch detection circuit. Of course, these connection wires corresponding to the touch electrodes in the row furthest from the touch detection circuit may also have the above-mentioned structure.

Generally, the touch electrode may be made of a transparent conductive oxide with a relatively high resistance, such as indium tin oxide (ITO). In order to reduce the resistance of the touch electrode, the array substrate in the embodiments of the present disclosure may further include resistive wires arranged at a layer different from the touch electrodes and each connected in parallel to each touch electrode through at least two via-holes. Alternatively, the resistive wires may be arranged at a layer identical to the wires, and made of a metal with a low resistance.

Figure 5:
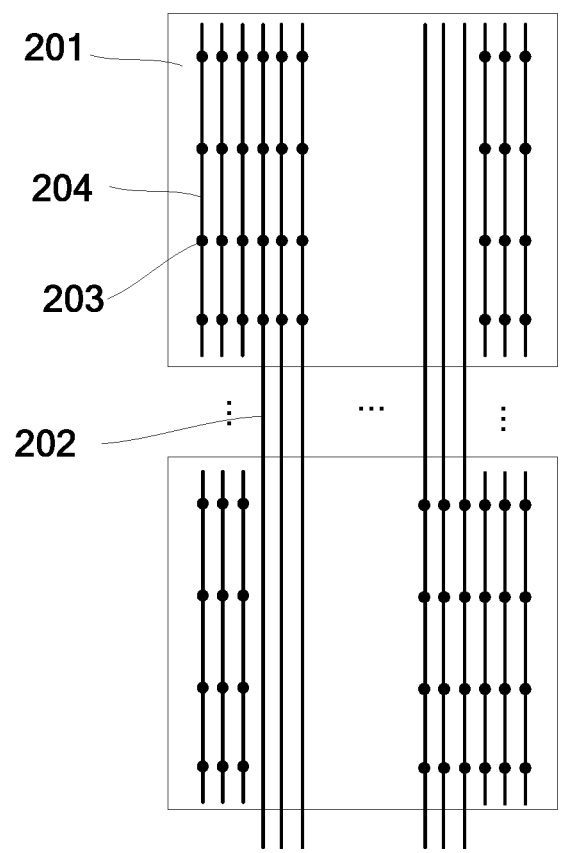
FIG. 5 is yet another schematic view showing the array substrate according to one embodiment of the present disclosure.

Referring to FIG. 5, which is a schematic view showing the arrangement of the wires and the resistive wires according to one embodiment of the present disclosure, a plurality of wires 202 and a plurality of resistive wires 204 are arranged at the coverage region of each touch electrode 201, and the resistive wires 204 are arranged at a layer identical to the wires 202. Within the coverage region of each touch electrode 201, the resistive wires 204 are arranged at both sides of the wire 202 uniformly. In this way, the via-holes 203 are arranged relatively uniformly within a region where each touch electrode 201 is located, so as to improve a display effect.

Figure 6:
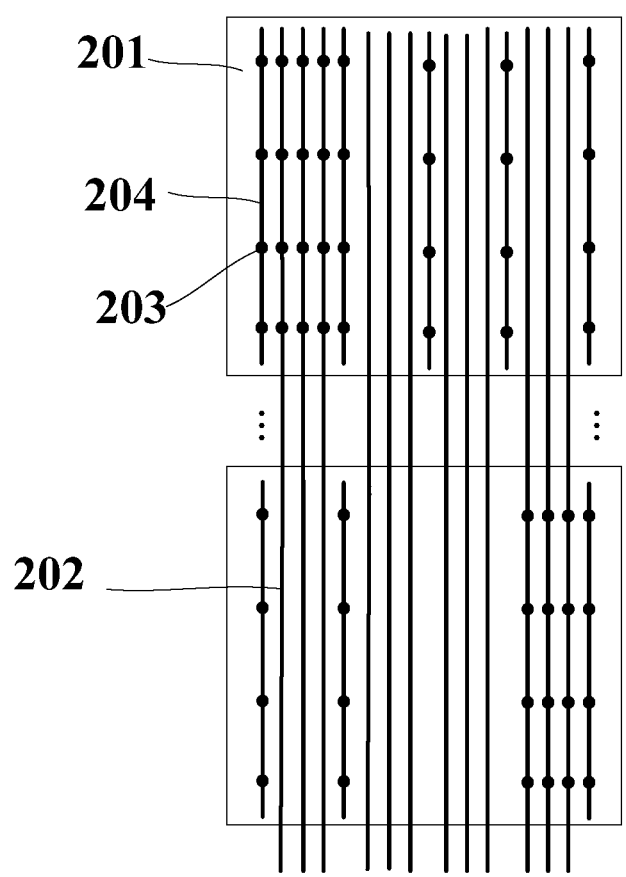
FIG. 6 is still yet another schematic view showing the array substrate according to one embodiment of the present disclosure.

Referring to FIG. 6, which is another schematic view showing the arrangement of the wires and the resistive wires according to one embodiment of the present disclosure, a plurality of wires 202 and a plurality of resistive wires 204 are arranged at the coverage region of each touch electrode 201, the resistive wires 204 are arranged at a layer identical to the wires 202, and the resistive wires 204 are arranged alternately between the wires 202 corresponding to different touch electrodes 201 within the coverage region of the touch electrode 201. In this way, the via-holes 203 are arranged more uniformly within the region where each touch electrode 201 is located, so as to improve the display effect in a better manner.

In the embodiments as shown in FIGS. 5 and 6, each touch electrode 201 corresponds to three connection wires 202. Of course, in the other embodiments of the present disclosure, each touch electrode 201 may correspond to one, two, or more than three connection wires 202.

In FIGS. 5 and 6, in each column, the touch electrode 201 at an upper portion is located furthest from the touch driver circuit, and the touch electrode 201 at a lower portion is located closest to the touch driver circuit.

In the embodiments of the present disclosure, alternatively, projections of the resistive wires and the wires onto the array substrate in a perpendicular direction are located within a region where projections of the data lines onto the array substrate in the perpendicular direction are located, so as to prevent an aperture ratio from being adversely affected.

In some embodiments, the resistive wires and the wires are provided in an amount and distributed in a manner identical to the data lines. In other words, when there are m pixels within a coverage region of a touch electrode, m*n resistive wires and wires are arranged within the region, and n represents the number of subpixels for one pixel.

In the above embodiments, the touch electrodes are arranged in a column like the data lines. Of course, in the other embodiments of the present disclosure, the touch electrodes may also be arranged in a row like the gate lines.

In the embodiments of the present disclosure, the touch electrode may be multiplexed as a common electrode, i.e., the plurality of touch electrodes forms a common electrode layer. A common electrode signal is applied to each touch electrode by the touch detection circuit within a display period, and a change in a capacitance of each touch electrode is detected within a touch period so as to determine a position where a touch has been made.

To be specific, a duration desired for displaying one frame by the touch screen may be divided into a display period and a touch period. Within the display period, a gate scanning signal is applied to the gate lines of the touch screen sequentially, and a grayscale signal is applied to a data signal line. At this time, the touch electrode serves as a common electrode, and a constant common electrode signal is applied to the touch electrode by the touch detection circuit connected thereto, so as to achieve a display function. Within the touch period, a touch signal is applied to the touch electrodes by the touch detection circuit connected thereto, and the touch electrodes are detected, so as to achieve a touch function. Within the touch period, no signal is applied to each ate signal lien and each data signal line of the touch screen.

The present disclosure further provides in some embodiments an in-cell touch screen including the above-mentioned array substrate.

The present disclosure further provides in some embodiments a display device including the above-mentioned in-cell touch screen and a touch detection circuit configured to determine a position where a touch has been made in accordance with a change in a capacitance of a touch electrode.

When the touch electrode is multiplexed as a common electrode, a common electrode signal is applied to the touch electrode by the touch detection circuit within a display period, and the change in the capacitance of the touch electrode is detected within a touch period so as to determine the position where the touch has been made.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. An array substrate, comprising:
   a plurality of gate lines,
   a plurality of data lines,
   a plurality of touch electrodes arranged at an identical layer within display regions defined by the plurality of gate lines and the plurality of data lines and separated from each other, and
   a plurality of wires arranged at a layer different from the plurality of touch electrodes and each configured to connect a corresponding touch electrode of the plurality of touch electrodes to a touch detection circuit,
   wherein respective wires of the plurality of wires arranged parallel with respect to one another, the respective wires having an identical length and an identical width, the respective wires arranged in an identical configuration within a coverage region of a respective touch electrode of the plurality of electrodes, and
   each wire of the plurality of wires connected to the corresponding touch electrode by way of via-holes, the via-holes distributed uniformly within the coverage region, wherein the array substrate further comprises a plurality of resistive wires arranged at a layer different from the touch electrodes and connected in parallel to respective touch electrodes through at least two via-holes, the plurality of wires and the plurality of resistive wires arranged at the coverage region of the respective touch electrode, and the plurality of resistive wires are arranged alternately between the plurality of wires corresponding to different touch electrodes within the coverage region of the respective touch electrode.

2. The array substrate according to claim 1, wherein at least a portion of each wire of the plurality wires comprising a first segment connected to a corresponding touch electrode through a via-hole, a second segment for connecting the first segment and the touch detection circuit, and a third segment connected to the first segment and formed by extending the first segment in a direction away from the second segment.

3. The array substrate according to claim 1, wherein the resistive wires are arranged at a layer identical to the wires.

4. The array substrate according to claim 1, wherein the plurality of wires and the plurality of resistive wires are arranged at the coverage region of a respective touch electrode, and the plurality of resistive wires are arranged at both sides of each wire.

5. The array substrate according to claim 1, wherein projections of the plurality of the resistive wires and the plurality of wires onto the array substrate in a perpendicular direction are located within a region where projections of the plurality of data lines onto the array substrate in the perpendicular direction are located.

6. The array substrate according to claim 1, wherein the plurality of resistive wires and the plurality of wires are provided in an amount and distributed in a manner identical to the plurality of data lines.

7. An in-cell touch screen, comprising the array substrate according to claim 1.

8. A display device, comprising the in-cell touch screen according to claim 7, and a touch detection circuit configured to determine a position where a touch has been made in accordance with a change in a capacitance of a touch electrode.

9. The in-cell touch screen according to claim 7, wherein the plurality of touch electrodes forms a common electrode layer, a common electrode signal is applied to each touch electrode by the touch detection circuit within a display period, and a change in a capacitance of each touch electrode is detected within a touch period so as to determine a position where a touch has been made.

* * * * *